US007990467B2

(12) United States Patent
Shirakura

(10) Patent No.: US 7,990,467 B2
(45) Date of Patent: Aug. 2, 2011

(54) PARALLAX IMAGE PICKUP APPARATUS AND IMAGE PICKUP METHOD

(75) Inventor: Akira Shirakura, Tokyo (JP)

(73) Assignee: Sony Corporation (JP)

( * ) Notice: Subject to any disclaimer, the term of this patent is extended or adjusted under 35 U.S.C. 154(b) by 1295 days.

(21) Appl. No.: 11/268,071

(22) Filed: Nov. 7, 2005

(65) Prior Publication Data

US 2006/0119728 A1 Jun. 8, 2006

(30) Foreign Application Priority Data

Nov. 8, 2004 (JP) ................. P2004-323448

(51) Int. Cl.
*H04N 5/225* (2006.01)

(52) U.S. Cl. ............... 348/373; 348/40; 348/50

(58) Field of Classification Search ........ 348/41, 348/50
See application file for complete search history.

(56) References Cited

U.S. PATENT DOCUMENTS

| 765,980 | A | * | 7/1904 | Mercier | 396/329 |
|---|---|---|---|---|---|
| 2,158,660 | A | * | 5/1939 | Kanolt | 396/329 |
| 2,279,443 | A | * | 4/1942 | Chanosky | 396/329 |
| 2,572,994 | A | * | 10/1951 | Dudley | 396/329 |
| 3,392,648 | A | * | 7/1968 | Bartholomew | 396/324 |
| 3,589,257 | A | * | 6/1971 | Horiuchi | 396/329 |
| 3,769,890 | A | * | 11/1973 | Alasia | 396/324 |
| 5,175,616 | A | * | 12/1992 | Milgram et al. | 348/47 |
| 5,686,960 | A | * | 11/1997 | Sussman et al. | 348/218.1 |
| 5,883,695 | A | * | 3/1999 | Paul | 352/43 |
| 6,118,475 | A | * | 9/2000 | Iijima et al. | 348/42 |
| 6,781,619 | B1 | * | 8/2004 | Shirakura et al. | 348/46 |
| 6,862,140 | B2 | * | 3/2005 | Ogino | 359/473 |
| 2001/0014172 | A1 | * | 8/2001 | Baba et al. | 382/154 |
| 2001/0052935 | A1 | * | 12/2001 | Yano | 348/207 |
| 2002/0159108 | A1 | * | 10/2002 | Baba et al. | 359/9 |
| 2003/0210461 | A1 | * | 11/2003 | Ashizaki et al. | 359/443 |

FOREIGN PATENT DOCUMENTS

| JP | 64026833 U | 1/1989 |
|---|---|---|
| JP | 01-135440 | 9/1989 |
| JP | 07-319090 | 12/1995 |

(Continued)

OTHER PUBLICATIONS

Office Action from Japanese Application No. 2005-319023, dated Apr. 19, 2011.

*Primary Examiner* — Lin Ye
*Assistant Examiner* — Dennis Hogue
(74) *Attorney, Agent, or Firm* — Lerner, David, Littenberg, Krumholz & Mentlik, LLP

(57) ABSTRACT

A parallax image pickup apparatus for forming a parallax image train by photographing an object from a plurality of directions includes an image pickup unit in which an image pickup device and an image forming optical system are integrated in order to photograph the parallax images of the object; a rotating unit on which the image pickup unit is mounted and which rotates the image pickup unit in a parallax direction; an image pickup unit moving unit for rectilinearly moving the image pickup unit and the rotating unit synchronously with the rotation of the rotating unit; a control unit for controlling so that a virtual image pickup center portion is always located at the center of a photographed image; and a focal distance control unit for continuously changing a focal distance of the image pickup unit.

13 Claims, 14 Drawing Sheets

FOREIGN PATENT DOCUMENTS

| | | |
|---|---|---|
| JP | 07-325354 | 12/1995 |
| JP | 08-220659 | 8/1996 |
| JP | 10115877 A | 5/1998 |
| JP | 10143058 A * | 5/1998 |
| JP | 10-254079 A | 9/1998 |
| JP | 11127375 A | 5/1999 |
| JP | 11150741 A | 6/1999 |
| JP | 2000-066568 A | 3/2000 |
| JP | 2002354302 A | 12/2002 |
| JP | 2003187261 A | 7/2003 |
| JP | 2004045628 A | 2/2004 |

* cited by examiner (PRIOR ART)
Fig. 12A
(PRIOR ART)
Fig. 12B
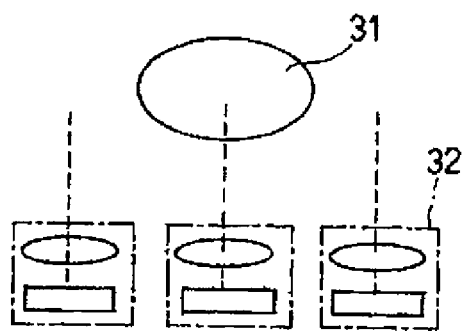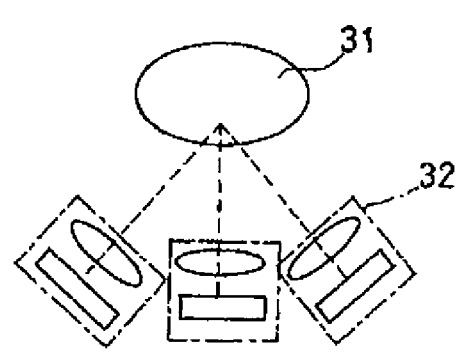
(PRIOR ART)
Fig. 12C
(PRIOR ART)
Fig. 12D
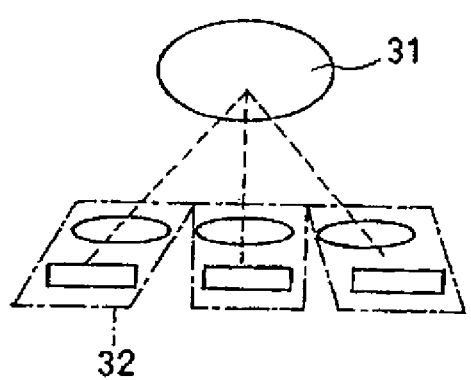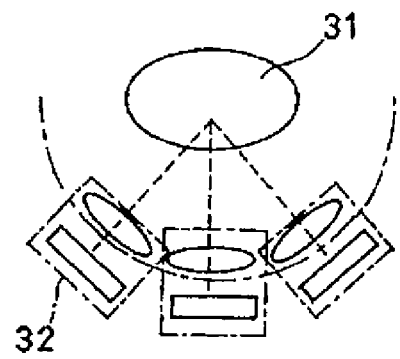

PARALLAX IMAGE PICKUP APPARATUS AND IMAGE PICKUP METHOD

CROSS-REFERENCE TO RELATED APPLICATIONS

The present invention claims priority from Japanese Patent Application No. JP 2004-323448 filed on Nov. 8, 2004, the disclosure of which is hereby incorporated by reference herein.

BACKGROUND OF THE INVENTION

The invention relates to a parallax image pickup apparatus and an image pickup method which are applied to creation of, for example, a holographic stereogram.

Two-dimensional images of an object which are obtained by seeing it from different visual points are used as original images and holograms to reproduce a three-dimensional image can be synthesized. A holographic stereogram is formed by, for example, a method whereby a number of images obtained by sequentially photographing an object from different observing points are used as original images and they are sequentially recorded as strip-shaped or dot-shaped element holograms onto a sheet of recording medium for a hologram.

For example, as for a holographic stereogram having parallax information only in the lateral direction, as shown in FIG. 10, a plurality of parallax images 12a to 12e are sequentially obtained by sequentially photographing an object 11 from different observing points in the lateral direction. Each image of a parallax image train (12a to 12e) is arranged so that, for example, a line focal point is formed on recording medium 13 for a hologram and those parallax images are recorded thereon at a proper angle by using reference light. That is, as shown in FIG. 11, the image is divided in a strip shape in the parallax direction and strip-shaped data in the different parallax images is reconstructed, that is, an image process of what is called "slice and Dice" is executed, thereby forming a hologram image D2. The hologram image D2 is formed by sequentially recording the strip-shaped element holograms onto the recording medium 13 for the hologram by an image recording apparatus.

In the holographic stereogram, since the image information obtained by sequentially photographing the object from the different observing points in the lateral direction has sequentially been recorded in the lateral direction as strip-shaped element holograms, when such a holographic stereogram is seen by both eyes of the observer, 2-dimensional images projected to his right and left eyes slightly differ. Thus, the observer feels a parallax and a 3-dimensional image is reproduced. The 3-dimensional image as well as the holographic stereogram is simply and properly referred to as a "hologram" hereinbelow.

As an image having a display effect similar to that of the holographic stereogram, there is also a stereogram using a microlens array such as lenticular or the like. Although the number of parallax images which can be recorded is generally smaller than that of the holographic stereogram, they are analogous in terms of a point that video images obtained by sequentially photographing an object from different observing points are recorded.

According to the parallax image train pickup apparatus to obtain such a plurality of original images, the object is photographed by a camera unit such as mobile camera, multiple-eye camera, or the like and a number of photographed images including the parallax information are formed. FIGS. 12A to 12D show a plurality of examples of a layout relation between an object 31 and a camera unit 32 in the parallax image train pickup apparatus.

The example shown in FIG. 12A relates to a form in which one camera unit 32 is horizontally moved for a predetermined time with respect to the object 31, the direction of the camera unit 32 to the object 31 is not changed, and the direction in which the camera unit 32 targets the object is not changed (what is called "Straight-ahead Camera on Straight Track"). That is, according to such a form, the camera unit 32 photographs the object 31 without typically targeting it.

FIG. 12B shows a form in which one camera unit 32 is horizontally moved for a predetermined time with respect to the object 31, the direction of the camera unit 32 to the object 31 is changed, and the direction in which the camera unit 32 targets the object is not changed (what is called "Panning Camera on Straight Track"). That is, according to such a form, since the direction of the camera unit 32 to the object 31 is changed in association with the horizontal movement of the camera unit 32, the camera unit 32 typically targets the object 31 and photographs it.

FIG. 12C shows a form in which one camera unit 32 is horizontally moved for a predetermined time with respect to the object 31, the direction of the camera unit 32 to the object 31 is not changed, and the direction in which the camera unit 32 targets the object is changed (what is called "Re-centering Camera on Straight Track"). That is, according to such a form, although the direction of the camera unit 32 to the object 31 is not changed in association with the horizontal movement of the camera unit 32, since an image pickup device and the like in the camera unit 32 are moved, the camera unit 32 typically targets the object 31 and photographs it.

The parallax image train pickup apparatus having the layout shown in FIG. 12C has been disclosed in JP-A-2000-066568. According to such an apparatus, although the direction of a photographing lens is not changed, a CCD camera is horizontally moved synchronously with that the camera unit is moved in the horizontal direction by a stepping motor, even if the camera unit is moved in the horizontal direction, the CCD camera can target the object at the center through the photographing lens.

Further, FIG. 12D shows a form in which one camera unit 32 is moved on a surrounding circumference of the object 31 for a predetermined time, (what is called "Rotating Camera"). The form in which the object 31 is rotated is called "Rotating Object". According to such a form, the camera unit 32 is circularly moved around the object 31, typically targets the object 31, and photographs it.

In the parallax image train pickup apparatus, it is also possible to provide a plurality of camera units 32 and simultaneously photograph the object 31, or the object 31 may be moved instead of the camera unit 32.

The parallax image train pickup apparatuses in the four forms shown in FIGS. 12A to 12D have a merit and a demerit, respectively. According to the form of "Straight Track" shown in FIG. 12A, although its structure is simple, since it is necessary to photograph the object at a wide angle of view so that the object is sufficiently included and most of the photographed image except for the object image is not used, valid resolution deteriorates.

According to the Re-centering form shown in FIG. 12C, it is necessary to form an image onto an area whose area is wider than that of the image pickup device and whose aspect ratio differs from the normal aspect ratio in accordance with the image pickup device or form anamorphic images of different vertical/lateral image forming magnifications. Anyway, it is necessary to manufacture a special optical lens system. Although a commercially available lens such as a lens for 35 mm of a silver salt photograph or the like can be also used, in such a case, there is such a limitation that if the image pickup device is too large contrarily, it is difficult to obtain high resolution, and if it is too small, it is difficult to obtain a wide angle of view. A possibility that the commercially available image pickup device can be used as it is is small.

According to the form (what is called Panning Camera on Straight Track) shown in FIG. 12B and the form (what is called Rotating Camera) shown in FIG. 12D, since the inherent camera unit can be used in its original form, there is an advantage that the apparatus can be constructed without remodeling the latest camera of high quality.

According to the form shown in FIG. 12D, since the object is fixed and the camera is moved along a circular orbit or since the camera is fixed and the object is rotated, there is an advantage that the object can be easily photographed by a relatively simple construction. However, in the case of forming a plane hologram, the following drawbacks can be mentioned: it is necessary to correct a trapezoidal distortion; and more strictly speaking, a distortion which cannot be fully corrected remains later and it is difficult to obtain accurate 3-dimensional localization information. Although the former trapezoidal distortion can be corrected by image processes, the latter is a perspective distortion which is caused in the case where although only the data obtained by photographing the object from the predetermined positions of the camera and the object is obtained, when the plane hologram is recorded, the image has to be constructed on the basis of information in which a distance between the hologram surface and the object is changed, that is, it is an uncorrectable distortion. For example, when the distance is fixed to 1 m although the object has to be photographed from the position which is away from the camera by 1.4 m, an unnatural distortion occurs.

In respect of this point, the form shown in FIG. 12B has an advantage that an image which has no perspective distortion and is suitable to form the plane hologram is obtained except for a distortion or the like of the optical lens system. On the other hand, since the distance between the camera and the object changes, there is a drawback in which it is difficult to obtain an accurate focal point.

Similarly, if the distance between the camera and the object changes, in the case of the same angle of view, a size of object changes. In the case of forming the plane hologram, even if a principle visual point position changes, the object needs to be seen in the same size. Therefore, a zooming process is necessary. Although such a zooming process can be also executed by an image process after the photographing, since the unnecessary zoomed image which is not used is photographed, there is a problem of deterioration of the resolution. In the case of monitoring the image in a real-time manner, there is also such a problem that unnaturalness in which the size of object changes remains.

Explanation will be supplemented with respect to the case of monitoring the image in a real-time manner. In FIG. 13, reference numeral 50 denotes a parallax image train pickup apparatus. In the parallax image train pickup apparatus 50, a half mirror 40 is arranged between the object 31 and the camera unit 32. That is, the camera unit 32 is arranged in a space surrounded by an upper substrate 42, a lower substrate 41, a side wall 43, and the half mirror 40.

A photographing unit 33 in the parallax image train pickup apparatus 50 has: the camera unit 32; a camera unit feeding mechanism 34; and an illuminating light source 35a for illuminating the object 31 which is being photographed.

The camera unit 32 has: for example, a ⅔-inch CCD camera 36 for photographing; the camera unit feeding mechanism 34 which is driven by a stepping motor; and a photographing lens 39. The camera unit 32 is put on the camera unit feeding mechanism 34 having a predetermined length, for example, a whole length of 2700 mm. When the photographing is started, the camera unit feeding mechanism 34 is driven by the stepping motor (not shown) or the like. The camera unit 32 is moved in the horizontal direction by the driving of the camera unit feeding mechanism 34.

In this case, in the parallax image train pickup apparatus 50, since the camera unit 32 is shut out by the half mirror 40, the object 31 hardly see the camera unit 32. Therefore, in the parallax image train pickup apparatus, the object 31 is not conscious of the movement of the camera unit 32 and a number of pickup images including parallax information can be photographed.

A television monitor 51 is arranged on the upper substrate 42. For example, an image obtained by photographing the object 31 from the front surface thereof is displayed together with the following conditions necessary for the photographing. That is, such conditions that information indicative of the photographing position of the object 31 such as image frames of the holographic stereogram which is formed and another image to be synthesized with the photographed images can be recognized by the object 31 prior to photographing.

It is possible to move the CCD camera 36 to the front position of the object 31 prior to photographing and photograph the image of the object 31 or it is also possible to arrange another CCD camera 52 or the like to the position in front of the object 31 and photograph it.

The image which is displayed on the TV monitor 51 while a pickup image D1 is being photographed may be a still image photographed before the photographing as mentioned above or the image from the front side of the object 31 during the photographing of the pickup image may be also displayed.

Instead of the image photographed from the front side of the object 31 as mentioned above, a number of pickup images including the parallax information of the object 31 which is photographed may be sequentially displayed.

By constructing as mentioned above, in the parallax image train pickup apparatus 50, the object 31 is not conscious of the movement of the camera unit 32 and a number of pickup images including the parallax information can be photographed. By allowing the object 31 to observe its own image during the photographing, the sight line of the object 31 is fixed and the object 31 is not unnecessarily moved. Therefore, the parallax image train pickup apparatus 50 can form the pickup image of high picture quality.

In the parallax image train pickup apparatus 50, the object 31 can grasp the conditions necessary for the photographing such as its own photographing position and the photographing state before and during the photographing.

Further, when the holographic stereogram is formed by synthesizing with another image, the parallax image train pickup apparatus 50 can presume the completed holographic stereogram.

As another construction, by arranging the monitor onto camera rails in a height position almost near the camera on the side opposite to the object without using the half mirror 40, it is also possible to enable the object to see the monitor during the photographing.

According to the form shown in FIG. 12B, in the case of moving the camera unit 32 on the straight camera rails, at the beginning and the last of the photographing when the camera unit 32 is located near both ends of the rails, the object is photographed from a remote position as compared with the state where the camera unit 32 is located at the center. Therefore, information which is not printed is photographed to a peripheral portion of the completed hologram. In the case of using such a real-time monitor, there is a possibility that the framing becomes erroneous. Therefore, it is important that the size of object is not changed and information close to the framing of the completed hologram can be monitored.

Since the camera is rotated while being moved on the straight rails, it is necessary to control at least the operations of two axes and it is complicated.

SUMMARY OF THE INVENTION

Since it is necessary to execute image processes by a post process, it is necessary to clearly specify parameters such as a camera movement and the like.

According to the invention, therefore, it is desirable to provide a parallax image pickup apparatus and an image pickup method in which when a parallax image train is formed by the parallax image pickup apparatus, an image which is typically in-focused and not deteriorated in image resolution can be realized in a form in which it also can be confirmed in a real-time manner.

According to an embodiment of the invention, there is provided a parallax image pickup apparatus for forming a parallax image train by photographing an object from a plurality of directions. The apparatus includes image pickup means in which an image pickup device and an image forming optical system are integrated in order to photograph parallax images of the object; rotating means on which the image pickup means is mounted and which rotates the image pickup means in a parallax direction; image pickup unit moving means for rectilinearly moving the image pickup means and the rotating means synchronously with the rotation of the rotating means; control means for controlling so that a virtual image pickup center portion is always located at the center of a photographed image; and focal distance control means for continuously changing a focal distance of the image pickup means.

According to another embodiment of the invention, there is provided a parallax image pickup method of forming a parallax image train by photographing an object from a plurality of directions. The method includes rotating image pickup means in a parallax direction, the image pickup means including an image pickup device integrated with an image forming optical system in order to photograph the parallax images of the object; photographing the parallax images by rectilinearly moving the image pickup means and the rotating means synchronously with the rotation so that a virtual image pickup center portion is always located at the center of a photographed image; and continuously changing a focal distance of the image pickup means upon photographing.

According to the embodiment of the invention, in the panning system in which a photographing camera is not selected as an apparatus for photographing the parallax image and an image which is suitable to form, for example, a plane hologram and which has no perspective distortion is obtained, a problem in which the focusing state is not obtained because the distance between the camera and the object changes can be solved.

Similarly, in the panning photographing system, a drawback in which, when the distance between the camera and the object changes, in the case of the same angle of view, the size of the object changes can be solved by the zooming process. Further, by optically executing the zooming, the problem of resolution deterioration is solved and in the case of monitoring the image in a real-time manner, the unnaturalness in which the size of the object changes is also improved.

By synchronously controlling the complicated operation in which the camera is rotated while moving it on the straight rails and, at the same time, the focusing and zooming are made operative and managing those parameters, an accurate image process can be executed for the subsequent printing process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 12A to 12D are diagrams schematically explaining a positional relation between the object and a camera unit;

DETAILED DESCRIPTION

An embodiment of the invention will be described in detail hereinbelow with reference to the drawings. The invention is not limited to the following example but arbitrary modifications are naturally possible within the scope of the invention without departing from the spirit of the invention.

Figure 1:
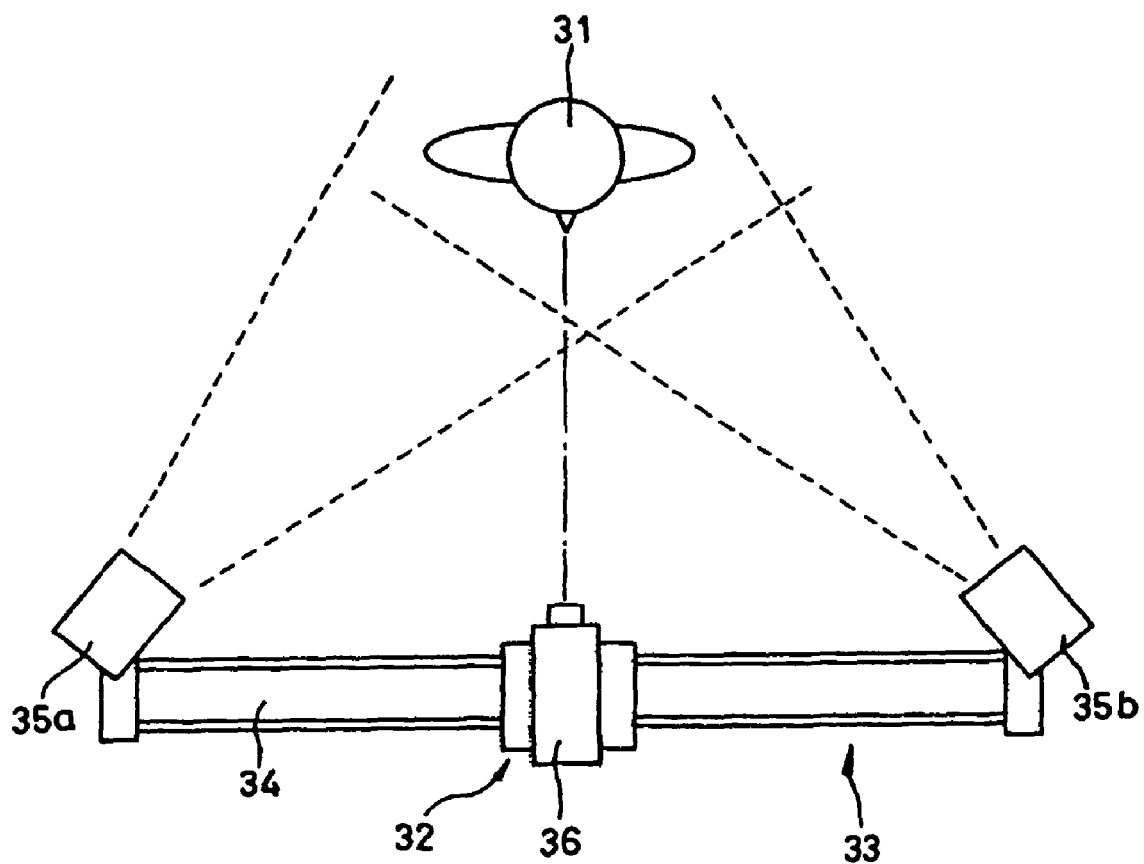
FIG. 1 is a plan view of a photographing unit and an object according to an embodiment of the invention.
Figure 13:
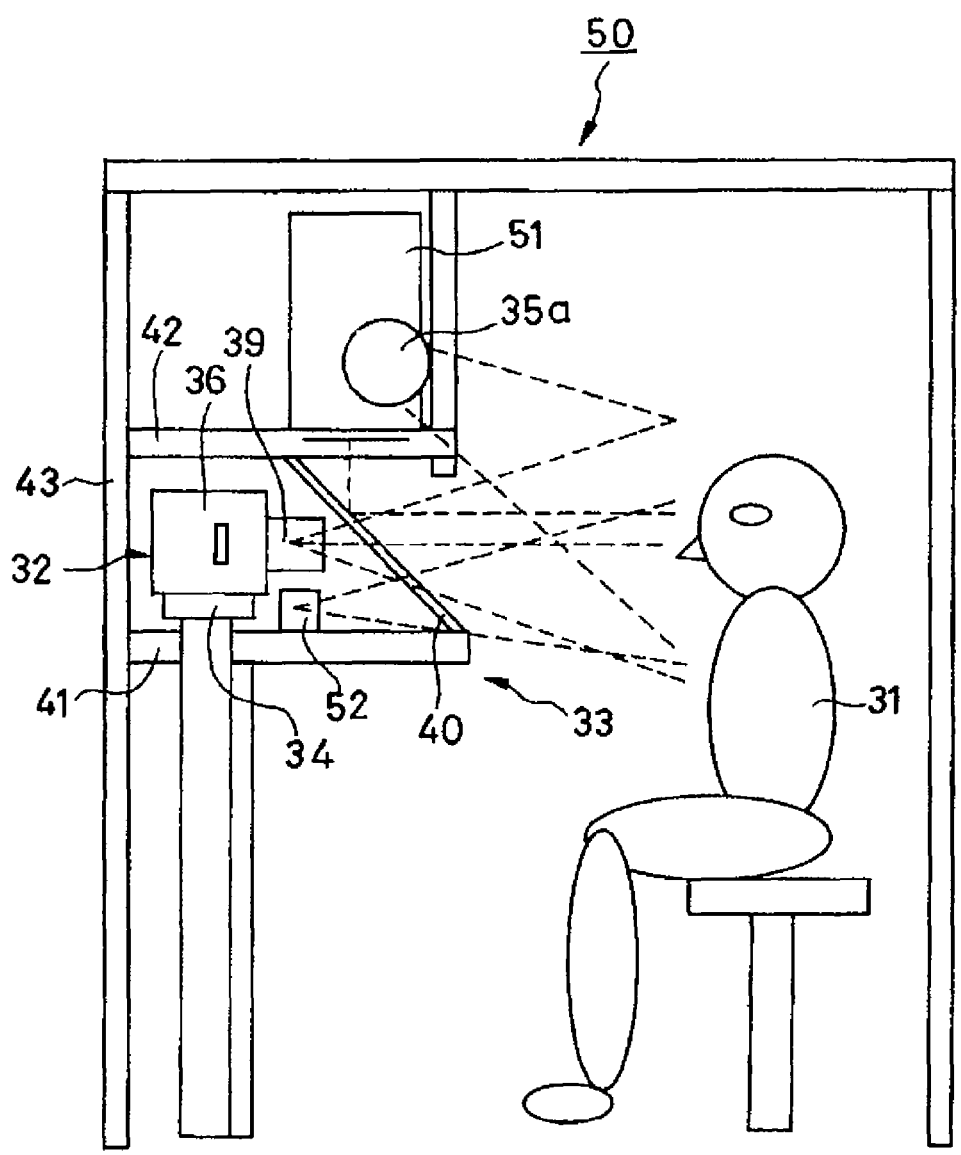
FIG. 13 is a side elevational view of an example of a parallax image pickup apparatus and the object and is a schematic diagram for explaining the state where a half mirror is arranged between the object and the camera unit, a television monitor is arranged over the half mirror, and an image displayed on the TV monitor is displayed on the half mirror.

FIG. 1 shows a schematic construction of a parallax image pickup apparatus according to the embodiment of the invention. For easy understanding, it is assumed that the reference numerals common to those in FIG. 13 are used. The photographing unit 33 has the camera unit 32, camera unit feeding mechanism 34, and illuminating light sources 35a and 35b for illuminating the object 31 which is being photographed.

The camera unit 32 has, for example, the ⅔-inch CCD camera 36 for photographing a motion image. The camera unit 32 is put on the camera unit feeding mechanism 34 having a predetermined length, for example, a whole length of 3000 mm.

When the photographing is started, the camera unit 32 in which the camera unit feeding mechanism 34 is driven by the stepping motor (not shown) or the like is moved in the horizontal direction by the driving of the camera unit feeding mechanism 34. As a camera unit feeding mechanism 34, a construction having a rack, a pinion, and straight rails is used, as will be explained hereinafter.

As shown in FIG. 12B, the embodiment has a construction of the form in which one camera unit 32 is horizontally moved for a predetermined time with respect to a virtual photographing image center position 310, the direction of the camera unit 32 to the virtual photographing image center position 310 is changed, and the direction in which the camera unit 32 targets the object is not changed (what is called "Panning Camera on Straight Track"). That is, according to this form, since the direction of the camera unit 32 to the virtual photographing image center position 310 is changed in association with the horizontal movement of the camera unit 32, the camera unit 32 typically targets the virtual photographing image center position 310 and photographs it.

Figure 2:
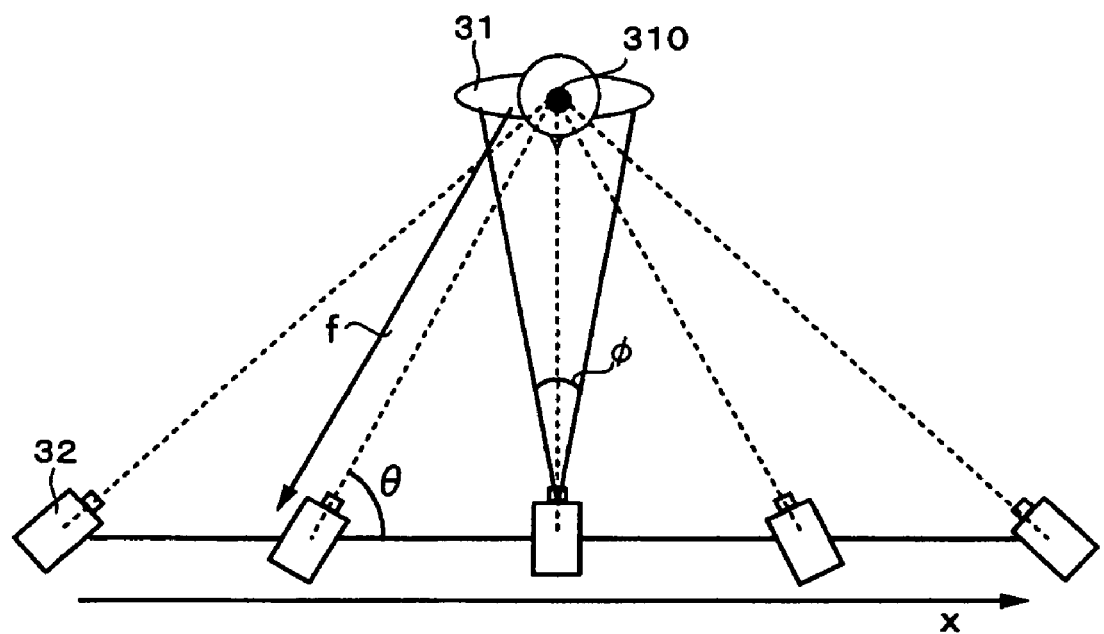
FIG. 2 is a schematic diagram for use in explanation of a change in parameters during the photographing according to the embodiment of the invention.
Figure 14A:
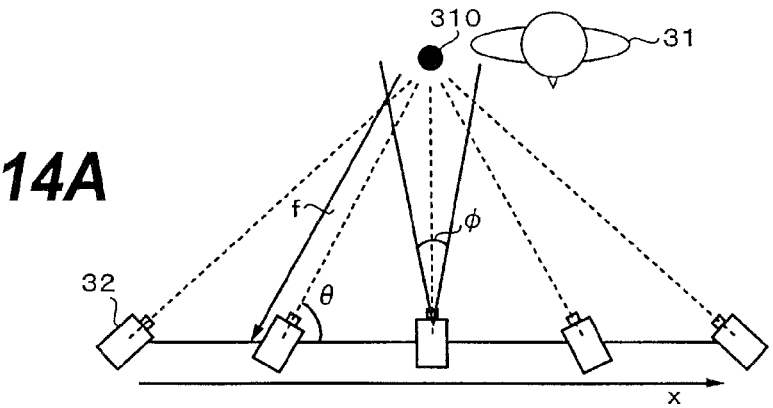
FIGS. 14A, 14B, and 14C are schematic diagrams for explaining a photographing method of the embodiment of the invention.
Figure 14B:
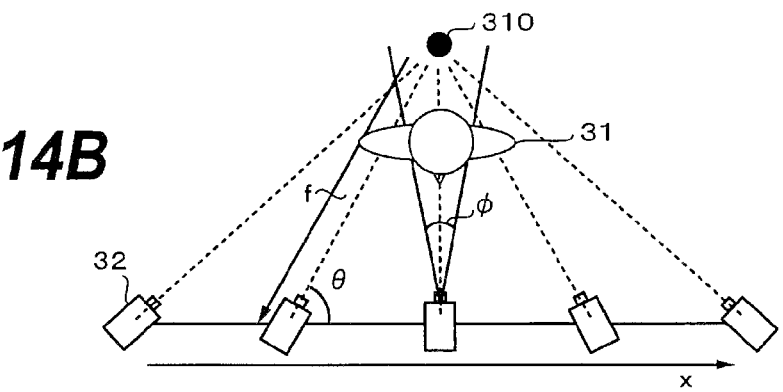
Figure 14C:
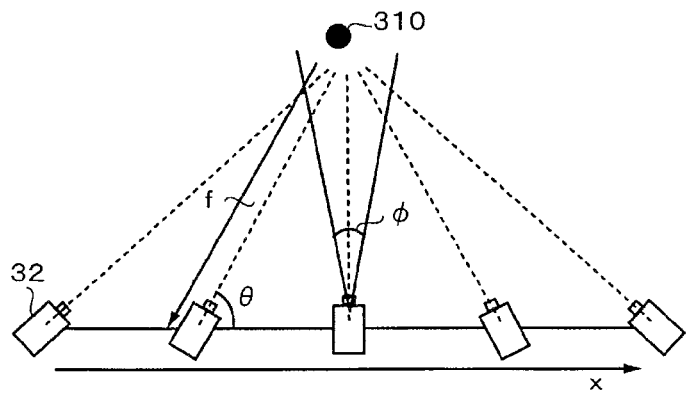

The object 31 is illustrated in the position where it happened to be substantially overlapped with the virtual photographing image center position 310 in FIG. 2. However, as shown in FIGS. 14A, 14B, and 14C or the like, even if the object 31 exists in an offset position or a plurality of objects exist, by fixing the virtual photographing image center position 310, a focal point, a magnification, an angle of view, distortion correction, and the like can be adjusted with respect to this point.

The stepping motor is used as a driving source to horizontally move the camera unit 32. Another stepping motor is used as a driving source to change the direction of the camera unit 32. The two stepping motors are synchronously rotated by using, for example, a common driving pulse. The invention is not limited to the stepping motor but an AC servo motor or the like can be also used as a driving source.

As shown in FIG. 2, it is assumed that a position of the camera unit 32 is set to x, an angle of the camera unit 32 to the moving direction (x direction) is labeled as θ, an angle of view which faces the object 31 is labeled as φ, and a distance between the position of the camera unit 32 and the virtual photographing image center position 310 is set to f. For example, a change in parameter in the case where the camera unit 32 is moved on the rails in a range of ±1500 mm for 4 seconds and in a range from (θ=−45°) to (θ=+45°) will be explained. When the camera 36 photographs the motion image, a necessary number of still images are picked up from the motion images obtained for 4 seconds and used as parallax images. It is also possible to use a construction in which a still image camera is used as a camera 36 and its shutter is turned on at predetermined timing.

Figure 3A:
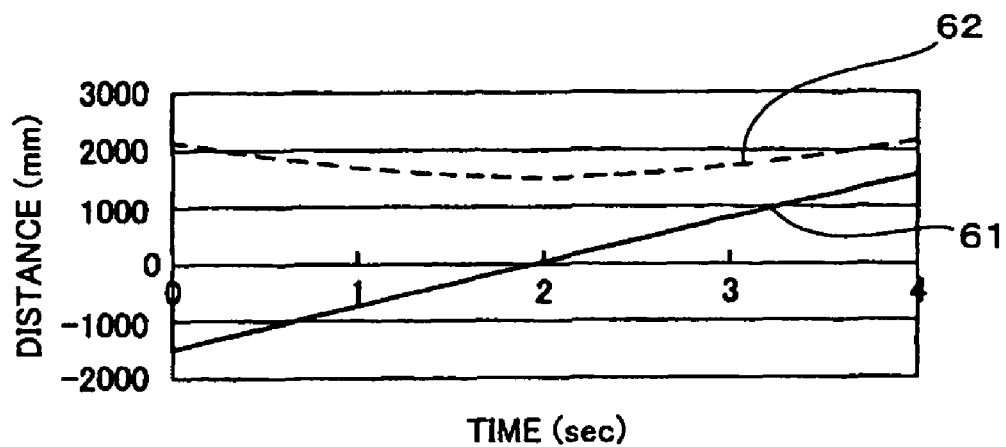
FIGS. 3A and 3B are graphs each showing an example of the change in parameters during the photographing in the case of a uniform linear motion according to the embodiment of the invention.
Figure 3B:
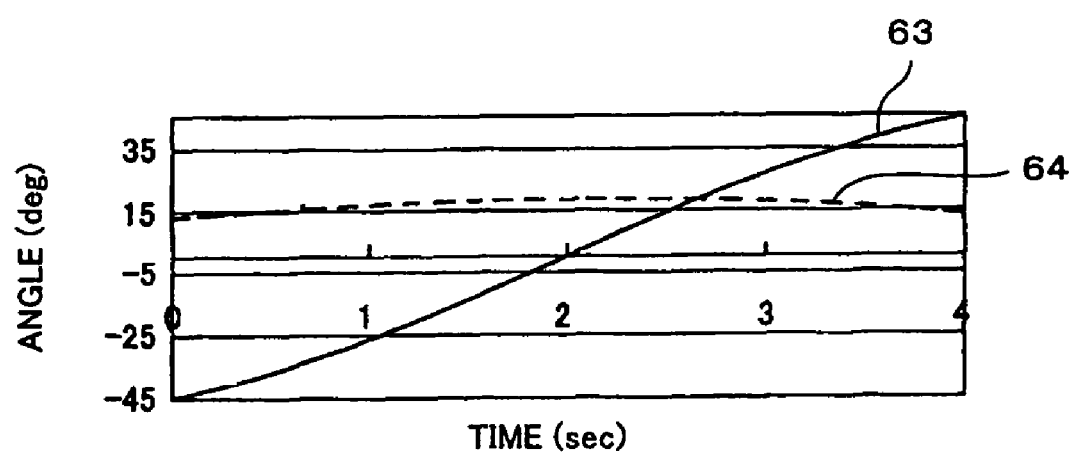

FIGS. 3A and 3B show the change in parameters during the photographing in the case where the camera unit 32 is moved in the horizontal direction by the uniform linear motion in the state where it typically faces the object. In FIG. 3A, a solid line 61 shows a change in position x of the camera unit 32 and a broken line 62 shows a change in distance f between the camera and the virtual photographing image center position. In FIG. 3B, a solid line 63 shows a change in camera angle θ and a broken line 64 shows a change in angle of view φ. In the case of the uniform linear motion, the change in position x is proportional to the time.

Figure 4A:
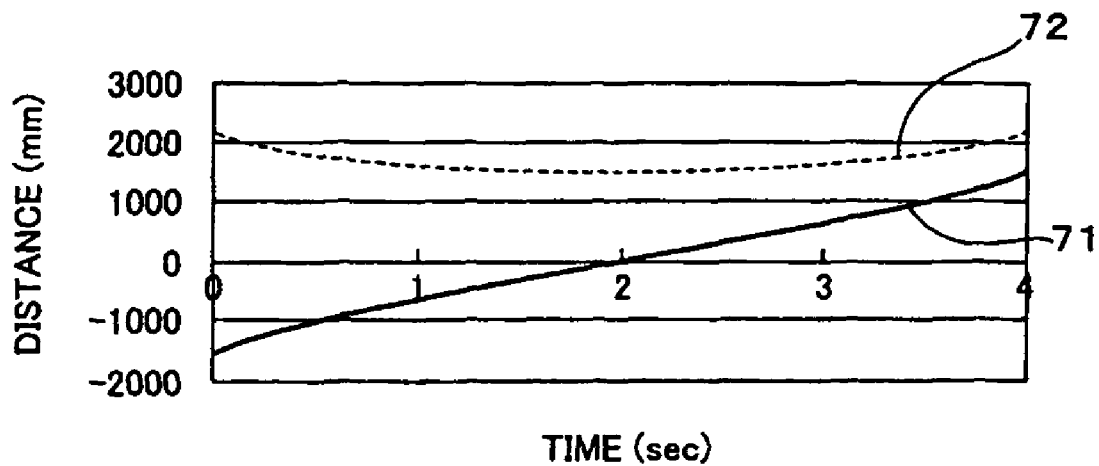
FIGS. 4A and 4B are graphs each showing an example of the change in parameters during the photographing in the case of a uniformly accelerated motion according to the embodiment of the invention.
Figure 4B:
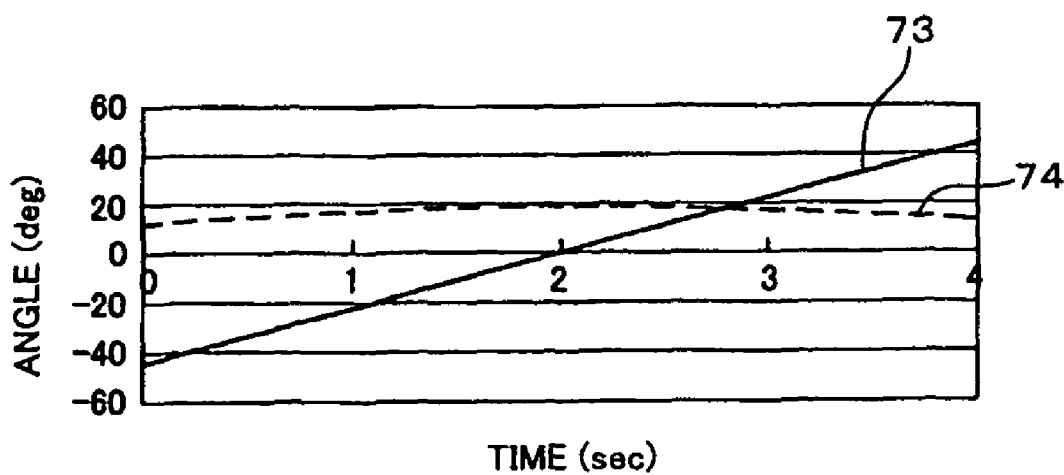

FIGS. 4A and 4B show the change in parameters during the photographing in the case where the rotating operation of the camera unit 32 is executed by the constant angular velocity motion in the state where it typically faces the virtual photographing image center position. In FIG. 4A, a solid line 71 shows a change in position x of the camera unit 32 and a broken line 72 shows a change in distance f between the camera and the virtual photographing image center position. In FIG. 4B, a solid line 73 shows a change in camera angle θ and a broken line 74 shows a change in angle of view φ. In the case of the constant angular velocity motion, the change in camera angle θ is proportional to the time.

It is necessary for various kinds of control and correction to previously obtain the change in parameters during the photographing in the case where the uniform linear motion is performed or the change in parameters during the photographing in the case where the constant angular velocity motion is performed. Information to control the focal distance adjusting operation of the camera unit 32 can be obtained from the change in distance f between the camera and the virtual photographing image center position. Information to control the direction of the camera unit 32 can be obtained from the change in camera angle θ. Further, information to control the magnification can be obtained from the change in angle of view φ according to the position x.

Figure 5:
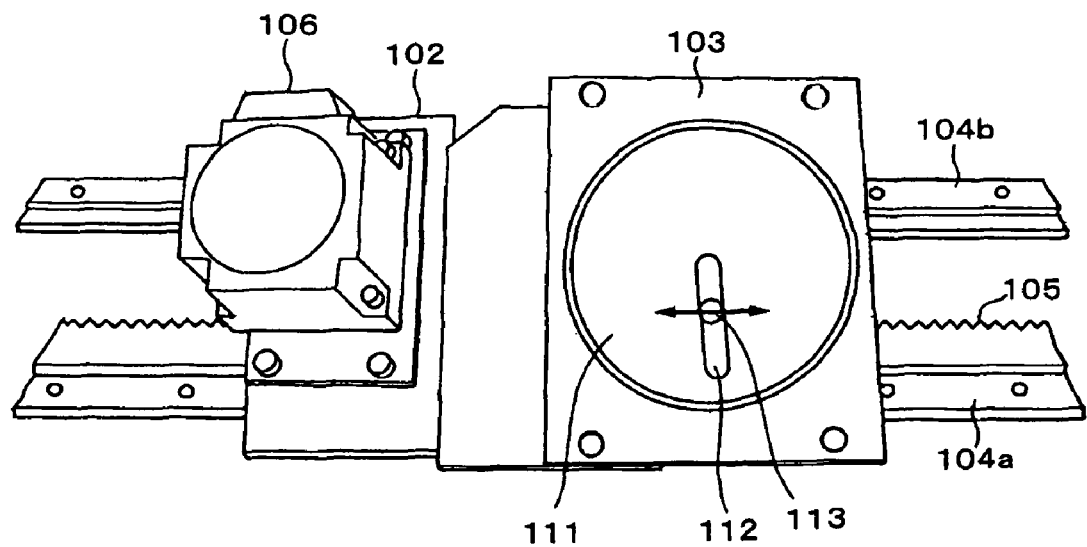
FIG. 5 is a perspective view of an example of a carrier as image pickup unit moving means according to the embodiment of the invention.
Figure 6:
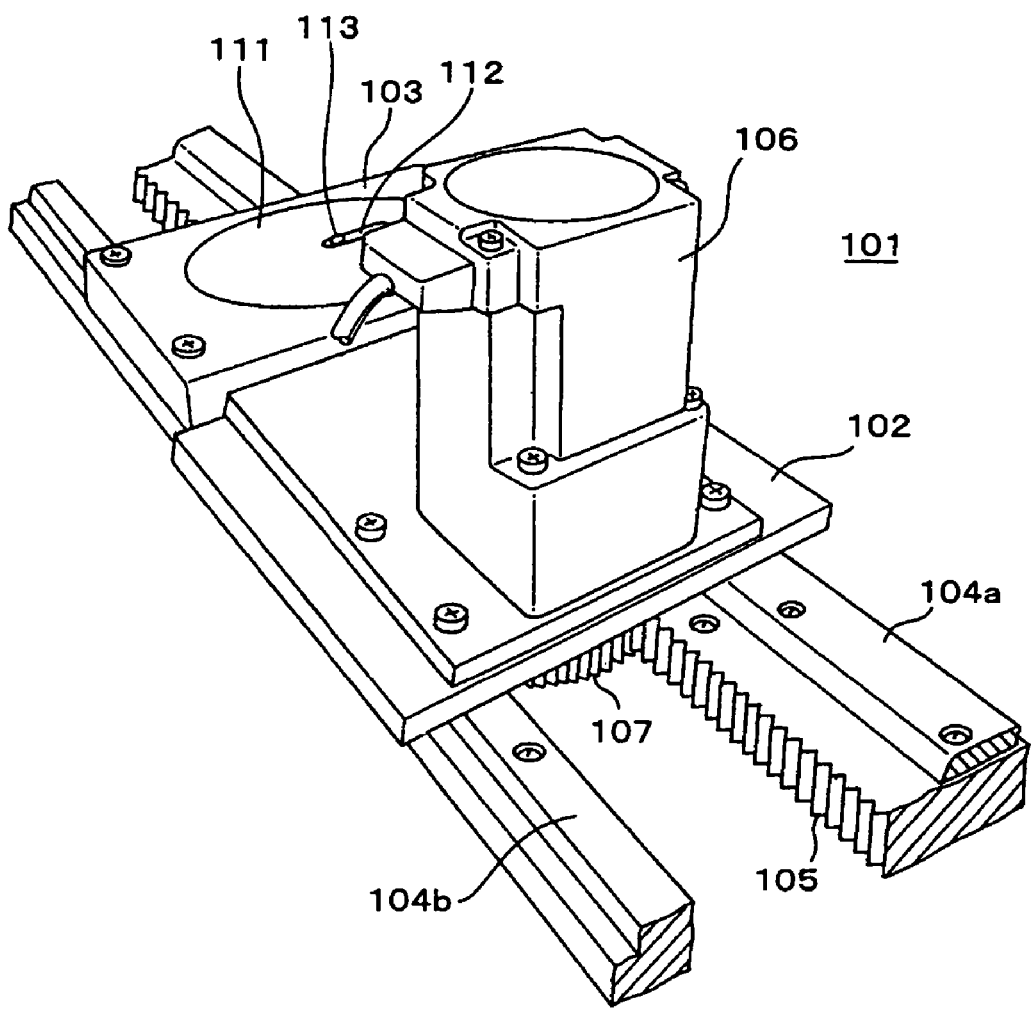
FIG. 6 is a perspective view of an example of the carrier as image pickup unit moving means according to the embodiment of the invention.

A structure of a carrier portion as image pickup unit moving means on which the camera unit 32 is mounted according to the embodiment of the invention will now be described with reference to FIGS. 5 and 6. Reference numeral 101 denotes the whole carrier. The carrier 101 includes a motor holding unit 102 and a camera holding unit 103. The motor holding unit 102 and the camera holding unit 103 are moved on two parallel rails 104a and 104b held horizontally.

A feed motor 106 with a construction of, for example, a stepping motor is attached onto the motor holding unit 102. On the lower side of the motor holding unit 102, a pinion 107 is attached to a rotary shaft of the feed motor 106. Since the rotation of the motor 106 is transferred to a rack 105 fixed to the rail 104a side through the pinion 107, the holding units 102 and 103 and the whole camera unit mounted thereon are moved on the rails 104a and 104b.

A rotary table 111 as rotating means for rotating the camera unit in the parallax direction is attached onto the camera holding unit 103. The camera unit is fixed to the rotary table 111. The rotary table 111 is attached so as to be rotatable in the horizontal direction. A notch 112 in a long-hole shape extending in the radial direction from the position near the center of the rotary table is formed in the rotary table 111. A follower 113 as a cylindrical projection is inserted into the notch 112.

A driving source, for example, a motor-driven cylinder is attached to the lower side of the camera holding unit 103. The follower 113 is directly coupled with a slider attached to a ball screw which is rotated by the cylinder. The follower 113 is one-dimensionally displaced in the horizontal direction by the motor-driven cylinder at a position which is offset from the rotary shaft of the rotary table 111. An arrow in FIG. 5 indicates the direction of the displacement of the follower 113. When the follower 113 is moved by a certain stroke, the rotary table 111 is rotated in accordance therewith and the direction of the camera unit is changed. For example, in the case of displacing the camera unit in a range of ±45° around the object as a rotational center, the follower 113 is horizontally displaced by ±14 mm at the position which is offset by 28 mm from the center of the rotary table 111.

Since the rotation of the feed motor 106 and the rotation of the rotary table 111 by the motor-driven cylinder are synchronized, while they are moved on the rails from one end to the other end, the camera unit is also rotated and enabled to typically face the object.

For example, by allowing the motor-driven cylinder to perform the uniform linear motion simultaneously with that the feed motor 106 is rotated at a constant speed so that the carrier 101 is moved by a certain stroke by the uniform linear motion, the photographing in which the camera typically faces the virtual photographing image center position can be realized. As described with reference to FIGS. 3A and 3B, by changing the angle θ of the camera unit as shown by the solid line 63 with respect to the change 61 in movement of the camera unit in the horizontal direction, control can be made so that the camera unit typically faces the virtual photographing image center position.

Since the follower 113 is displaced so as to allow the rotary table 111 to perform the constant angular velocity rotation, the photographing in which the camera typically faces the virtual photographing image center position can be realized. As described with reference to FIGS. 4A and 4B, by changing the movement of the camera unit in the horizontal direction (change 71) and the angle θ of the camera unit (change 73) as shown in FIGS. 4A and 4B, control can be made so that the camera unit typically faces the virtual photographing image center position.

In any of the uniform linear motion and the constant angular velocity motion, since the motion of the carrier 101 and the motion of the follower 113 are similarly executed with a certain speed ratio, their actuators can be also constructed as a single unit. That is, the rotation from the feed motor 106 may be transferred to the follower 113 through a reduction mechanism.

Although what is called a self-running structure in which the feed motor 106 is mounted onto the carrier 101 has been used, it is also possible to arrange motors in end portions of the rails 104a and 104b and transfer their rotations by belts, ropes, chains, or the like. For example, such a rotation transfer mechanism can be realized by a construction in which two belts are driven by one actuator, one belt is coupled with the whole carrier 101, and the other belt is coupled with the follower 113.

Figure 7:
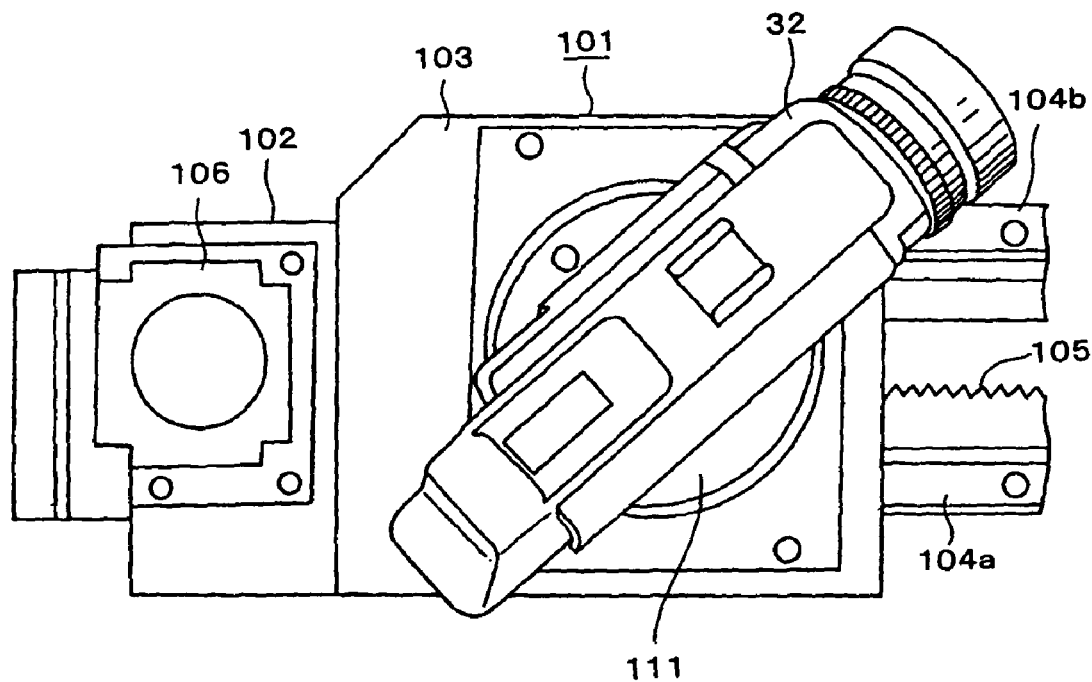
FIG. 7 is a plan view of the state where an image pickup unit is attached to the carrier according to the embodiment of the invention.
Figure 8:
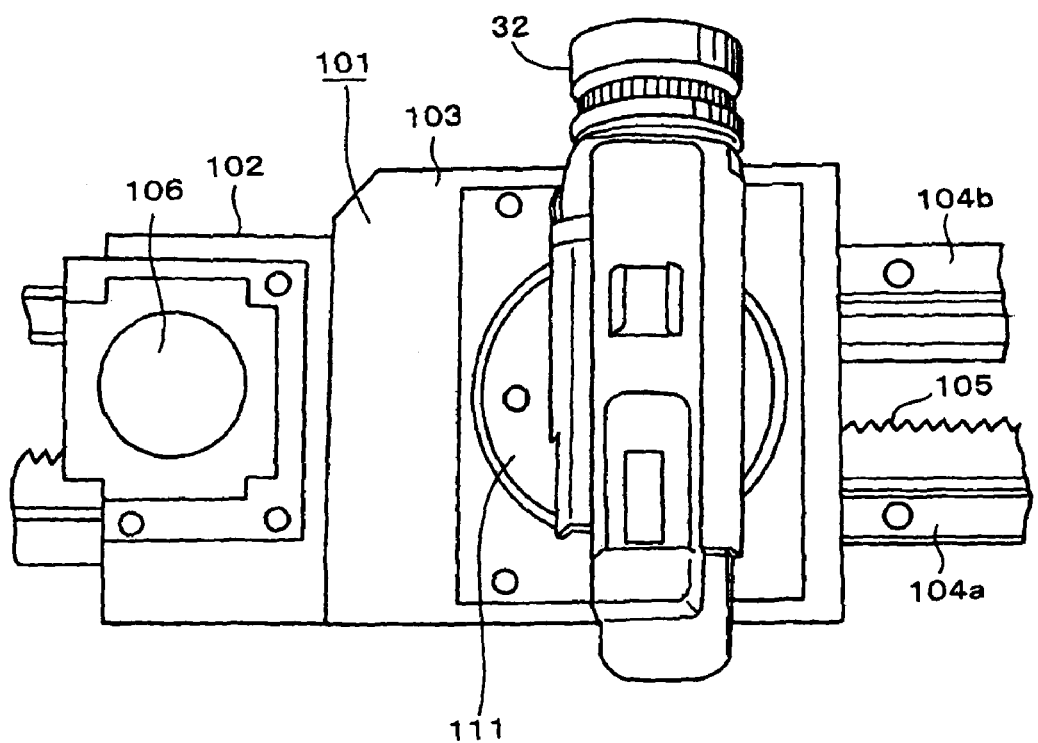
FIG. 8 is a plan view of the state where the image pickup unit is attached to the carrier according to the embodiment of the invention.
Figure 9:
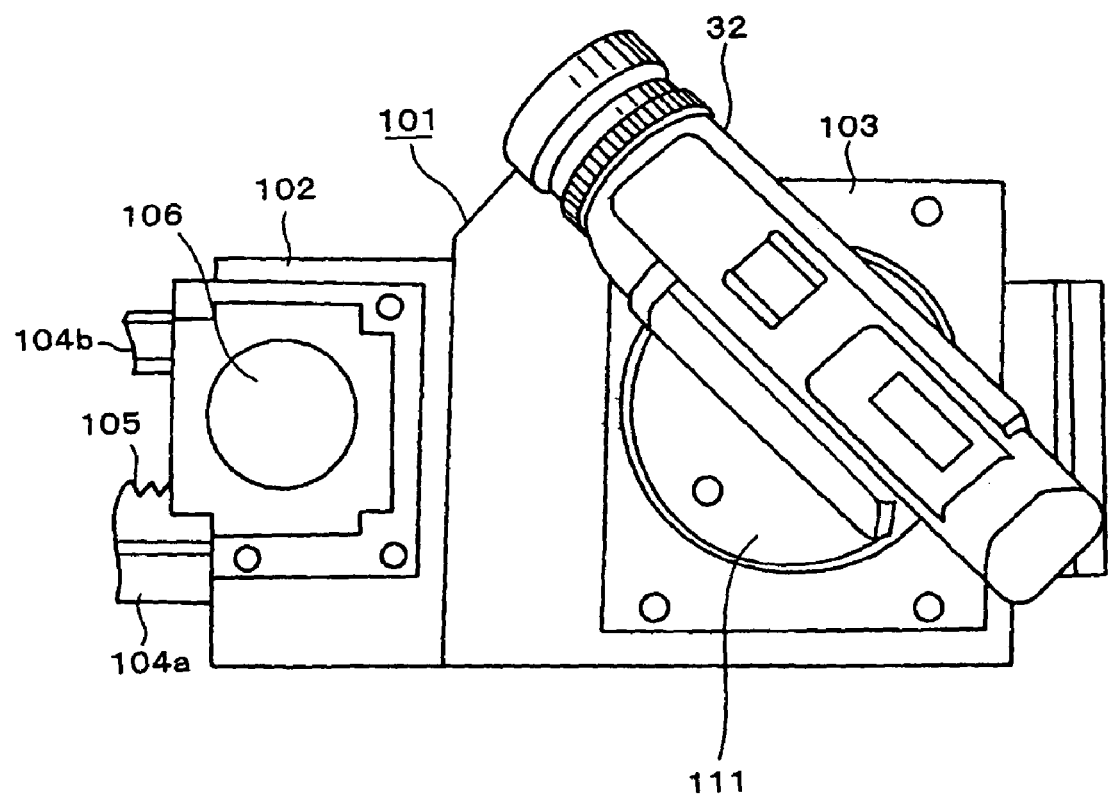
FIG. 9 is a plan view of the state where the image pickup unit is attached to the carrier according to the embodiment of the invention.
Figure 10:
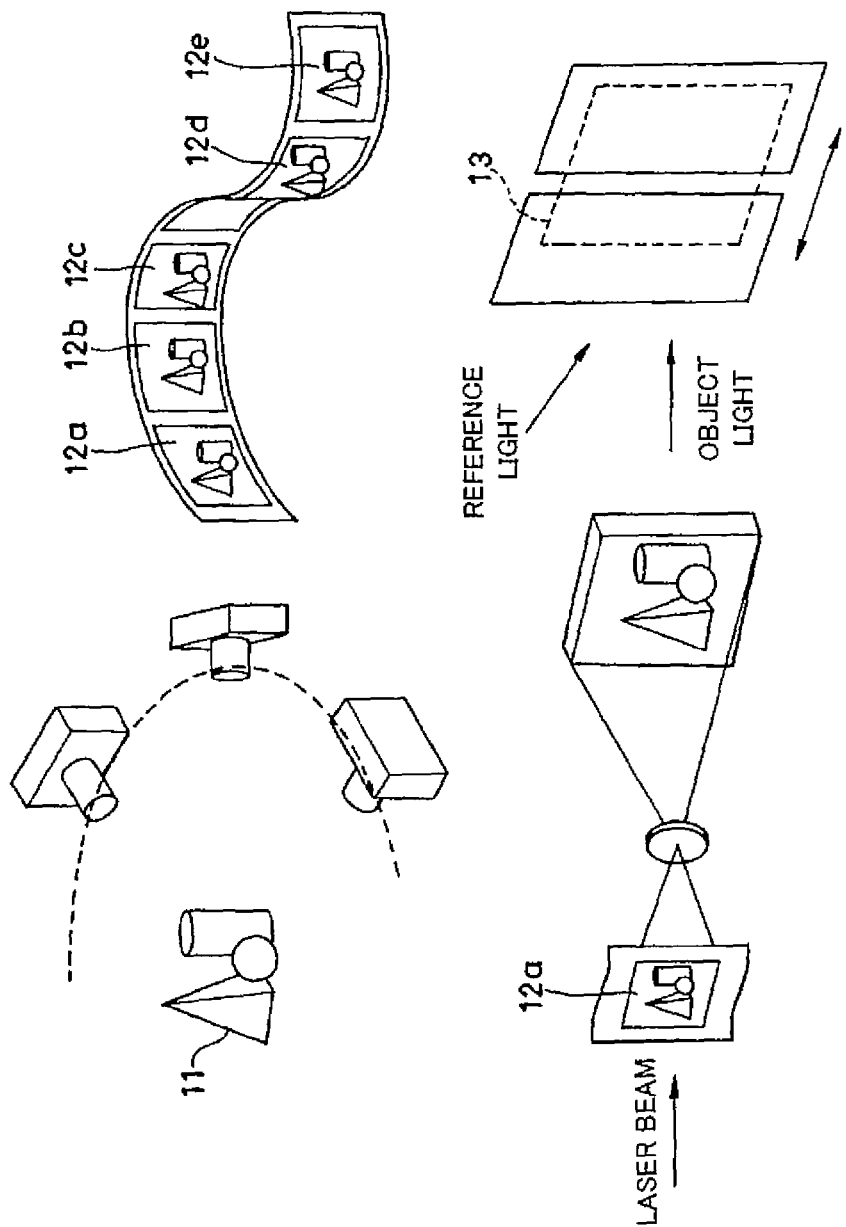
FIG. 10 is a diagram schematically explaining an optical system of a related holographic stereogram forming apparatus.
Figure 11:
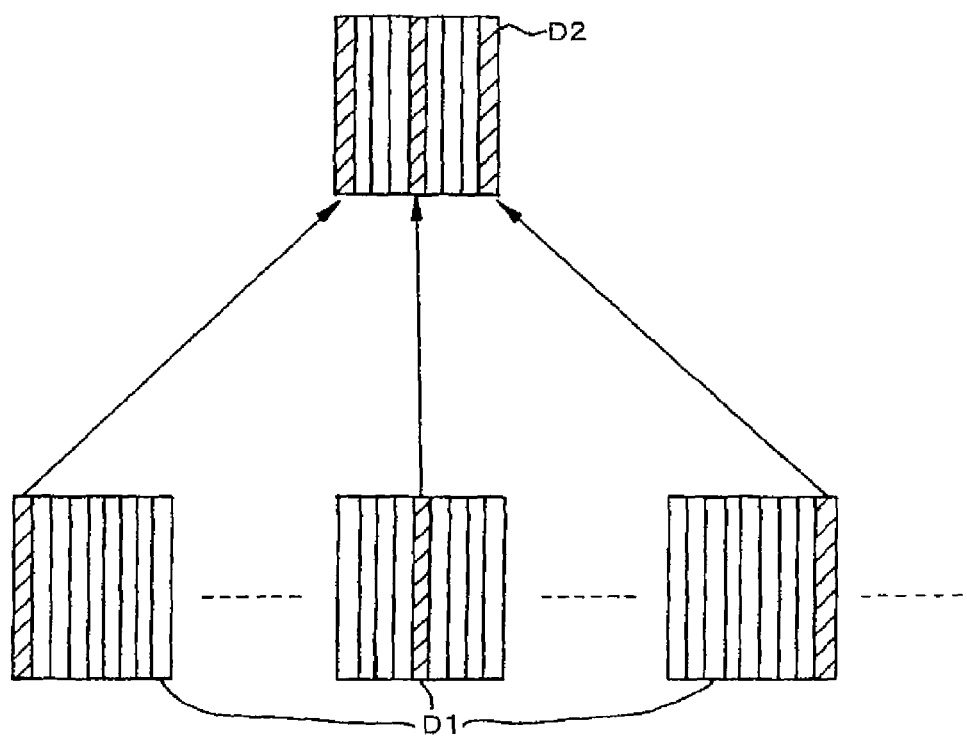
FIG. 11 is a schematic diagram for explaining an image process which is executed when a holographic stereogram is formed.

FIGS. 7, 8, and 9 show three states in the case where the camera unit 32 is attached onto the rotary table 111 and the object is photographed by the camera unit 32. FIG. 7 shows the state where the carrier 101 is located to the right end when seen from the virtual photographing image center position. FIG. 8 shows the state where the carrier 101 is located to the center when seen from the virtual photographing image center position. FIG. 9 shows the state where the carrier 101 is located to the left end when seen from the virtual photographing image center position.

A digital video image pickup apparatus of a handy type is used as a camera constructing the camera unit 32. The digital video image pickup apparatus is constructed in such a manner that the focal distance adjusting operation and the zooming operation can be controlled by control signals from an external system controller. However, for simplicity of drawings, cables led out of the image pickup apparatus are omitted.

According to the embodiment of the invention, a focus of the camera, that is, the focal distance is changed in a real-time manner in accordance with the motion of the camera mentioned above. That is, since the distance between the camera and the object changes in accordance with the motion of the camera as described with reference to FIGS. 3A, 3B, 4A, and 4B, a defocusing of the focal point occurs if the invention is not used.

As shown in FIGS. 3A, 3B, 4A, and 4B, since a movement distance and a movement angle of the camera have already been known, the lenses are synchronously driven on the basis of data which has preliminarily programmed so that the focal distance typically coincides with the distance to the virtual photographing image center position.

As another method, a method whereby the lenses are moved on the basis of a detection signal from a distance sensor attached in the camera and the focal point is adjusted in a real-time manner can be also used so long as the single object happened to exist in a position near the virtual photographing image center position 310 as shown in, for example, FIG. 2. Further, an auto-focusing function provided for the camera itself can be also used.

In addition, since the distance between the camera and the object changes during the photographing, the size of object changes during the photographing. According to the embodiment of the invention, the change in object size is subjected to a magnification correcting process during the photographing optically or by a digital image process, thereby making the object size constant. Specifically speaking, there is executed such a magnification correcting process that when a vertical rod existing on a plane which faces the camera including the virtual image center is virtually put, a length of vertical rod is not changed.

As shown in FIGS. 3A, 3B, 4A, and 4B, the above process can be also realized by a method whereby a magnification conversion image process is executed in a real-time manner synchronously with the movement on the basis of the known distance between the image pickup device and the virtual photographing image center position.

As another method, a method whereby magnification variable means which can optically vary an enlarging magnification is provided in the camera and a zoom lens in the camera is moved synchronously with the movement on the basis of the known distance between the image pickup device and the virtual photographing image center position.

In any of the above methods, by executing the image size correcting process during the photographing, even in an apparatus which can photograph the object while confirming the monitor screen, the accurate framing position can be confirmed.

A parallax image train forming method to which the invention is applied will now be described.

As mentioned above, it is a feature of the invention that not only in the apparatus which photographs the parallax image but also in the photographing method whereby an optical axis of the camera is moved so as to typically face the virtual photographing image center position while rectilinearly moving the camera, the angle of view is changed synchronously with the movement on the basis of the distance between the camera and the virtual photographing image center position.

The invention can be applied not only to the camera to photograph a real space but also to the method of rendering a virtual space of computer graphics.

Further, it is possible to use not only a method whereby the size is made constant by changing the whole enlarging magnification as mentioned above but also a method whereby an image correcting process for enlarging and reducing the image at different magnifications in dependence on the location in the image is executed in order to correct the trapezoidal distortion after each parallax image is formed or change the projecting surface.

As already described, in the images obtained by photographing the object on the basis of the layout called "Straight" in FIG. 12A and the layout called "Re-centering" in FIG. 12C, since the image pickup device is parallel with the flat surface, no trapezoidal distortion occurs. However, in the photographing system of the layout called "Panning" shown in FIG. 12B, since the image pickup device is not parallel with the hologram surface, a square is projected in a trapezoidal shape when seen from an oblique direction. In the case of recording the holographic stereogram of the flat surface, there is a case where the image is naturally seen by correcting such a distortion. That is, in the case where the virtual image center is set to the center of gravity and a rectangle which is parallel with the linear motion direction is virtually arranged, the virtual rectangle to be photographed becomes a trapezoid with respect to each of the photographed parallax images. However, if an image process for setting the virtual rectangle to a rectangle by correcting the trapezoidal distortion by also executing the magnification conversion in the vertical direction is executed, the rectangle is seen as a natural image.

In the distortion correcting process, the image correcting process for enlarging and reducing the image at different magnifications in dependence on the location in the image is executed. Since the value of the magnification which is used for the correction is known by the known photographing parameters, the image process can be executed in a real-time manner upon photographing.

The image process can be also applied to the case of rendering the virtual space of the computer graphics. If it is applied, the unnecessary portions are not rendered and the rendering can be effectively executed at the optimum resolution. It is advantageous in terms of the time and the picture quality.

Although the embodiment of the invention has specifically been described above, the invention is not limited to the foregoing embodiment but various modifications based on the technical idea of the invention are possible. For example, the invention is not limited to the holographic stereogram having only the parallax information in the lateral direction (what is called "Horizontal Parallax Only") but, naturally, the invention can be also applied to the holographic stereogram having the parallax information in the lateral and vertical directions (what is called "Full Parallax"). Such a holographic stereogram forming apparatus is constructed in such a manner that the object light and the reference light are converged in a dot shape in place of a strip shape, a recording medium for the hologram is relatively and two-dimensionally moved with respect to the light converging position, and the whole surface is exposed. In this case, in the parallax image train pickup apparatus, the camera unit is two-dimensionally moved.

Although the case where the invention is applied to the parallax image train pickup apparatus to form the holographic stereogram has been described above, the invention is not limited to such an example. For example, the invention can be also applied to any apparatus so long as a multiple-eye image such as a stereophonic photograph or the like of a lenticular type is formed. The parallax image train pickup apparatus can be applied not only to the display which can express a still image but also to a multiple-eye solid display or the like which can express a motion image.

It should be understood by those skilled in the art that various modifications, combinations, sub-combinations and alterations may occur depending on design requirements and other factors insofar as they are within the scope of the appended claims or the equivalents thereof.

The invention claimed is:

1. A parallax image pickup apparatus for forming a parallax image train by photographing an object from a plurality of directions, the apparatus comprising:
    image pickup means in which an image pickup device and an image forming optical system are integrated in order to photograph parallax images of the object;
    rotating means on which the image pickup means is mounted and which rotates the image pickup means in a parallax direction;
    image pickup unit moving means for rectilinearly moving the image pickup means and the rotating means synchronously with the rotation of the rotating means;
    control means for controlling so that a virtual image pickup center portion is always located at the center of a photographed image;
    focal distance control means for continuously changing a focal distance of the image pickup means;
    image processing means for processing so that when the virtual image pickup center portion is set to the center of gravity and a rectangle which is parallel with the linear motion direction is virtually arranged, although the virtual rectangle to be photographed becomes a trapezoid with respect to each of the photographed parallax images, the virtual rectangle is set to a rectangle by correcting the trapezoidal distortion in a real-time manner upon photographing by also executing magnification conversion in the vertical direction; and
    magnification variable means which can optically vary a magnification,
    correcting the trapezoidal distortion and executing magnification conversion in the vertical direction is performed on the basis of data which has been preliminarily programmed, the data including data relating focal distance to time and data relating camera angle to time,
    wherein a zoom lens in the image pickup means is moved synchronously with the rectilinear movement on the basis of a known distance between an image pickup device and the virtual image pickup center portion.

2. An apparatus according to claim 1, wherein when the object is put in an almost virtual image pickup center position, the focal distance adjustment by the focal distance control means is realized by an auto-focusing function of the image pickup means.

3. An apparatus according to claim 1, wherein the focal distance adjustment by the focal distance control means is realized by moving a lens in the image pickup means synchronously with the movement on the basis of a known distance between an image pickup device and the virtual image pickup center portion.

4. An apparatus according to claim 1, wherein a magnification conversion image process is executed in a real-time manner synchronously with the movement on the basis of a known distance between an image pickup device and the virtual image pickup center portion.

5. An apparatus according to claim 1, wherein the image pickup unit moving means and the rotating means are driven by a same actuator.

6. An apparatus according to claim 1, wherein the image pickup unit moving means and the rotating means are driven by different actuators and the different actuators are synchronously controlled.

7. An apparatus according to claim 1, wherein the object is photographed while moving the image pickup unit moving means so as to perform a uniform linear motion.

8. An apparatus according to claim 1, wherein the object is photographed while moving the rotating means so as to perform a constant angular velocity rotating motion.

9. A parallax image pickup method of forming a parallax image train by photographing an object from a plurality of directions, the method comprising:
rotating image pickup means in a parallax direction, the image pickup means including an image pickup device integrated with an image forming optical system in order to photograph the parallax images of the object;
photographing the parallax images by rectilinearly moving the image pickup means and the rotating means synchronously with the rotation so that the virtual image pickup center portion is always located at the center of a photographed image;
continuously changing a focal distance of the image pickup means upon photographing; and
processing so that when the virtual image pickup center portion is set to the center of gravity and a rectangle which is parallel with the linear motion direction is virtually arranged, although the virtual rectangle to be photographed becomes a trapezoid with respect to each of the photographed parallax images, the virtual rectangle is set to a rectangle by correcting the trapezoidal distortion in a real-time manner upon photographing by also executing magnification conversion in the vertical direction,
correcting the trapezoidal distortion and executing magnification conversion in the vertical direction is performed on the basis of data which has been preliminarily programmed, the data including data relating focal distance to time and data relating camera angle to time,
wherein a zoom lens in the image pickup means is moved synchronously with the rectilinear movement on the basis of a known distance between an image pickup device and the virtual image pickup center portion.

10. A method according to claim 9, wherein when the object is put in an almost virtual image pickup center position, the focal distance adjustment is realized by an auto-focusing function of the image pickup means.

11. A method according to claim 9, wherein the focal distance adjustment is realized by moving a lens in the image pickup means synchronously with the movement on the basis of a known distance between an image pickup device and the virtual image pickup center portion.

12. A method according to claim 9, wherein a magnification conversion image process is executed in a real-time manner synchronously with the movement on the basis of a known distance between an image pickup device and the virtual image pickup center portion.

13. A parallax image pickup apparatus for forming a parallax image train by photographing an object from a plurality of directions, the apparatus comprising:
an image pickup unit in which an image pickup device and an image forming optical system are integrated in order to photograph parallax images of the object;
a rotating unit on which the image pickup unit is mounted and which rotates the image pickup unit in a parallax direction;
an image pickup unit moving unit for rectilinearly moving the image pickup unit and the rotating unit synchronously with the rotation of the rotating unit;
a control unit for controlling so that a virtual image pickup center portion is always located at the center of a photographed image;
a focal distance control unit for continuously changing a focal distance of the image pickup unit;
an image processing unit for processing so that when the virtual image pickup center portion is set to the center of gravity and a rectangle which is parallel with the linear motion direction is virtually arranged, although the virtual rectangle to be photographed becomes a trapezoid with respect to each of the photographed parallax images, the virtual rectangle is set to a rectangle by correcting the trapezoidal distortion in a real-time manner upon photographing by also executing magnification conversion in the vertical direction; and
a magnification variable unit which can optically vary a magnification,
correcting the trapezoidal distortion and executing magnification conversion in the vertical direction is performed on the basis of data which has been preliminarily programmed, the data including data relating focal distance to time and data relating camera angle to time,
wherein a zoom lens in the image pickup unit is moved synchronously with the rectilinear movement on the basis of a known distance between an image pickup device and the virtual image pickup center portion.

* * * * *